(No Model.)  2 Sheets—Sheet 1.
T. W. BRACHER & T. WEBB.
SEWING MACHINE.
No. 324,217.  Patented Aug. 11, 1885.
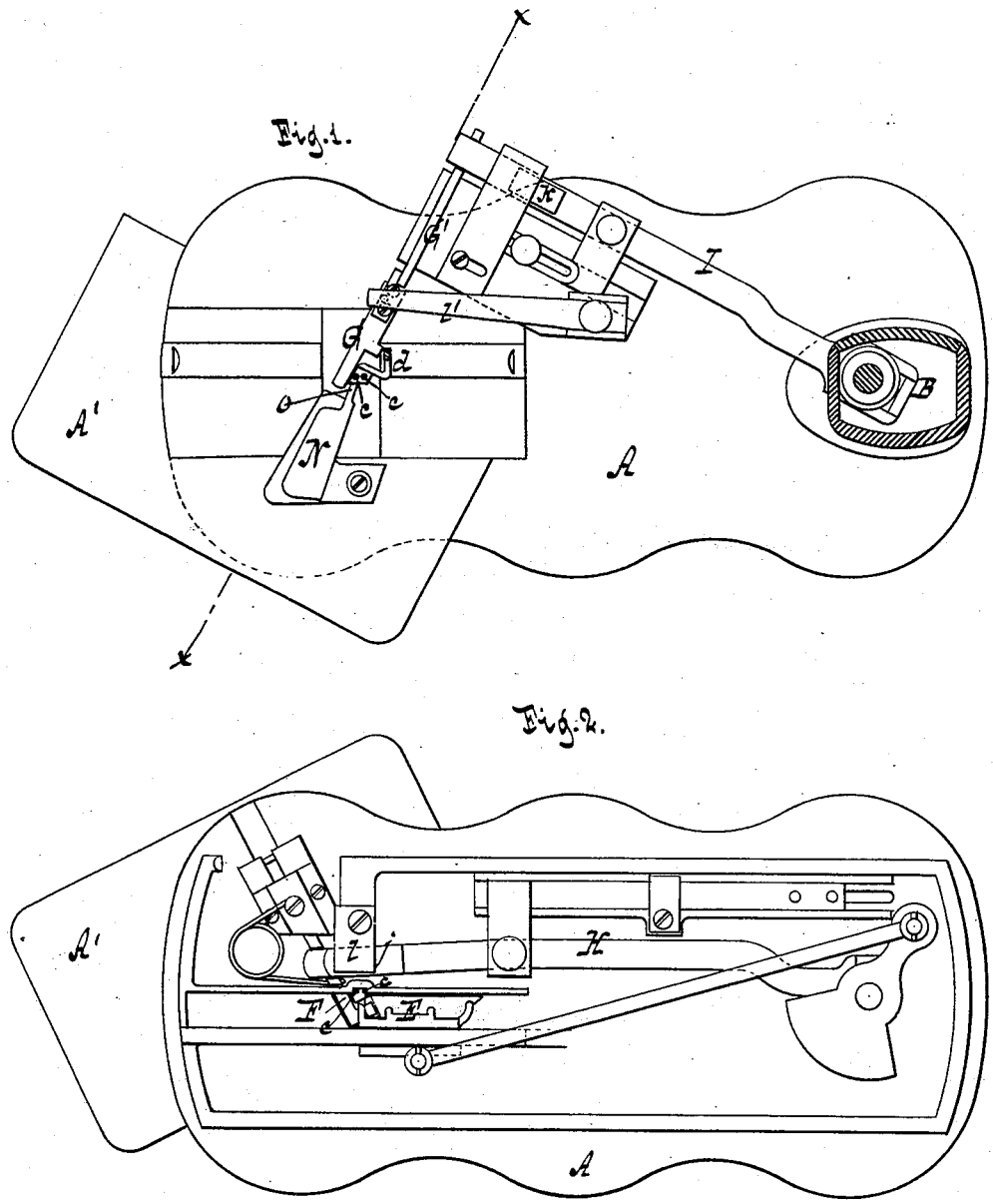
Witnesses
Otto Hufeland
William Miller
Inventors.
Thomas W. Bracher.
Thomas Webb.
by Van Santvoord & Hauff
Attys
N. PETERS, Photo-Lithographer, Washington, D. C.

(No Model.)  T. W. BRACHER & T. WEBB.  2 Sheets—Sheet 2.
SEWING MACHINE.
No. 324,217. Patented Aug. 11, 1885.
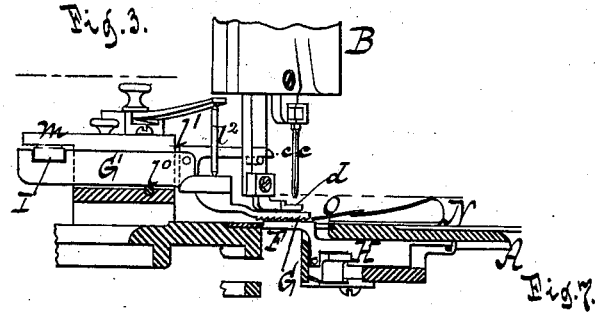
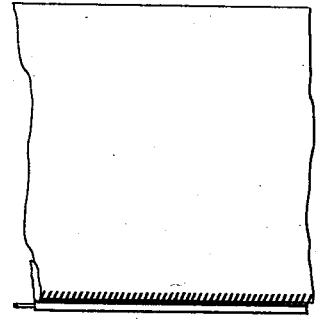
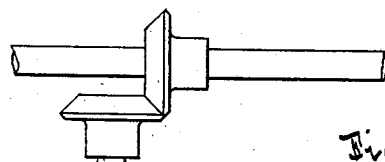
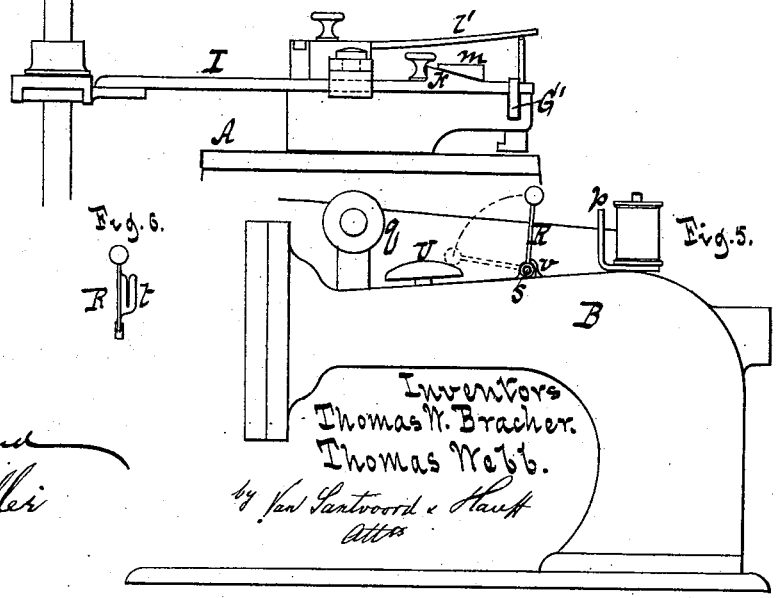
Witnesses
Otto Hufeland
William Miller
Inventors
Thomas W. Bracher.
Thomas Webb.
by Van Santvoord & Hauff
Attys

UNITED STATES PATENT OFFICE.

THOMAS W. BRACHER, OF WOODBRIDGE TOWNSHIP, MIDDLESEX COUNTY, NEW JERSEY, AND THOMAS WEBB, OF NEW YORK, N. Y., ASSIGNORS TO SAID BRACHER.

SEWING-MACHINE.

SPECIFICATION forming part of Letters Patent No. 324,217, dated August 11, 1885.

Application filed October 13, 1880. Renewed June 10, 1884. (No model.) Patented in England December 11, 1880, No. 5,184.

*To all whom it may concern:*

Be it known that we, THOMAS W. BRACHER and THOMAS WEBB, both citizens of the United States, said THOMAS W. BRACHER residing at Woodbridge township, in the county of Middlesex and State of New Jersey, and said THOMAS WEBB residing at New York, in the county and State of New York, have invented new and useful Improvements in Sewing-Machines, (for which we have obtained Letters Patent in Great Britain, No. 5,184, dated December 11, 1880,) of which the following is a specification.

This invention is adapted, among others, to sewing-machines for manufacturing the sweats for hats or caps, shown and described in Letters Patent of the United States granted to Thomas W. Bracher, July 13, 1880, No. 229,949.

It consists in certain novel combinations of parts, hereinafter fully described, and pointed out in the claims.

This invention is illustrated in the accompanying drawings, in which Figure 1 represents a horizontal section. Fig. 2 is an inverted plan view. Fig. 3 is a cross-section on the line $x\ x$, Fig. 1. Fig. 4 is a side view of the top feed mechanism. Fig. 5 shows a signal apparatus for indicating imperfections in the thread. Fig. 6 shows the signal-lever detached. Fig. 7 shows a piece of the sweat.

Similar letters indicate corresponding parts.

The letter A designates the ordinary cloth-plate, having attached thereto a subsidiary plate, A', at the place where the sweat is introduced to the machine, and B designates the machine-arm carrying the bars for the needles $c\ c$ and the presser-foot $d$, the latter being perforated for the passage of the needles, as shown in Fig. 1.

E designates a shuttle co-operating with the needles $c\ c$ to form the stitch-forming mechanism, and F G two feed-surfaces, one below and the other above the surface of the cloth-plate A.

When the machine is intended for sewing the hat-sweats before mentioned, these feed-surfaces F G are both arranged to move in a plane which is oblique to the plane of the needles $c\ c$, as indicated in Figs. 1 and 2, and hence if a sweat is presented thereto it is fed to the needles in a manner to bring one of the threads which constitute the connecting parts or members of the two rows of stitches obliquely to the edge of the sweat, as indicated in Fig. 7.

The feed-surfaces F G move in unison with each other, clamping the sweat, &c., between them, and the motion thereof is produced by means of levers H I, both having a horizontally oscillating and reciprocating motion, and both constructed with a wedge, $j$ or $k$, which rides upon or against a fixed pusher, $l$ or $m$, in the reciprocating motions of the levers, whereby the latter are displaced in a vertical direction; but the construction and operation of these parts are well known. The lever I acts on the top feed-surface, G, through a feed-bar, G', which carries such top surface and swings on a pivot, $l^3$, (see Fig. 3,) while it is subjected to the action of a spring, $l'$, having a tendency to depress the feed-surface. The spring $l'$ is arranged to act on the feed-bar G' through a swivel-pin, $l^2$, to avoid friction.

In ordinary sewing-machines having only a lower movable feed-surface the upper layer of material gets its motion only by frictional contact with the other or lower layer of material, which is in direct contact with and receives the impulse from the feed, and for this reason the lower layer has a tendency to move faster than the upper layer, another reason therefor being the fact that the upper layer is retarded by the presser-foot. By using the two feed-surfaces F G, one below and one above the cloth-plate, each having a positive motion independent of but in unison with the other, the two surfaces are caused to co-operate and both layers of material receive a positive motion, and hence the disadvantage named is thereby overcome. The presser-foot $d$ has a vertically-reciprocating motion, and clamps the work in the retrograde movement of the feed-surfaces, but rises in the forward motion thereof, so as to allow the free passage of the material.

The parts for operating the upper feed-surface, G, are in this example placed on the cloth-plate A; but in some cases, as when it is desired to sew the sweat-band directly to the hat-brim or to use the entire cloth-plate for manipulating the work, such parts may be applied to the machine-arm.

The lower feed-surface, F, is plain or smooth, while the upper feed-surface, G, is roughened in the usual manner, as shown in Fig. 3, and hence if a sweat is introduced to the machine in a reversed state, as described in the before-mentioned patent, the face thereof is presented to the lower or smooth feed-surface, and is thus left intact or uninjured, while the back of the sweat is caught by the upper roughened surface. If desired, however, both feed-surfaces F G may be left smooth or both may be roughened.

Suitable guides are used for introducing the sweat, as well as the parts to be attached thereto, and N designates the sweat-guide, the remaining guides being in this example omitted. From this guide N projects a flat spring-arm, O, the free end of which bears on the throat-plate adjacent to the needles $c\,c$, so that the sweat is clamped thereby adjacent to the sewing-point. The object of thus clamping the sweat is to insure its being presented to the stitch-forming mechanism in a perfectly flat state, and to assist in guiding the material uniformly thereto.

If desired, the spring-arm O may be made separate from the guide N.

A signal apparatus to operate an audible or visible signal is located between the thread-receiving eye $p$ and the tension device $q$, (see Fig. 5,) the same consisting in this example of a hammer-lever, R, which is hung on a pivot, S, fixed to the machine-arm B, and is provided with a slot, $t$, Fig. 6, open at one end for the reception of the thread, in connection with a gong, U. The slot $t$ is just wide enough to permit the thread to pass through it, and in its normal position the lever is inclined toward the thread-receiving eye $p$, this position thereof being determined by a stop, V; but when in the passage of the thread a knot or the like meets the lever the latter is thereby displaced and thrown upon the gong, so as to sound the same.

The mechanism whereby a vertically-reciprocating motion is imparted to the presser-foot is not sought to be covered in this application.

What we claim as new, and desire to secure by Letters Patent, is—

1. In a sewing-machine substantially as described, and in combination with the two needles and concomitant parts, a feed mechanism arranged obliquely to the plane of the needles, and formed, as shown, with two movable feed-surfaces, F G, one above and one below the sewing-line, the lever I, pivoted feed-bar G', and spring $l'$, the feed-surface G being roughened, and the feed-surface F being smooth, as and for the purpose set forth.

2. The combination, in a sewing-machine, of two reciprocating needles, two co operating feed-surfaces, one above and the other below the sewing-line, and mechanism for imparting to both feed-surfaces a positive motion in an oblique direction to the plane of the needles, substantially as described.

In testimony whereof we have hereunto set our hands and seals in the presence of two subscribing witnesses.

THOMAS W. BRACHER. [L. S.]
    THOMAS WEBB. [L. S.]

Witnesses:
    W. HAUFF,
    E. F. KASTENHUBER.